United States Patent [19]

Steimer

[11] Patent Number: 4,757,871
[45] Date of Patent: Jul. 19, 1988

[54] RECREATIONAL VEHICLE

[76] Inventor: Jean-Marie Steimer, Châlet "Les Mélèzes", 04260 - Allos, France

[21] Appl. No.: 908,328

[22] Filed: Sep. 17, 1986

[30] Foreign Application Priority Data

Sep. 17, 1985 [FR] France ................................ 85 13863

[51] Int. Cl.$^4$ .......................... B62B 15/00; A63C 5/00
[52] U.S. Cl. .................................. 180/273; 180/24.01; 180/332; 180/333; 280/91; 280/93; 280/87.01; 280/480
[58] Field of Search ...................... 180/22, 24.01, 332, 180/333, 273; 280/91, 93, 87.01, 480, 292

[56] References Cited

U.S. PATENT DOCUMENTS

| 2,914,131 | 11/1959 | Maurice et al. | 180/273 |
| 3,506,079 | 4/1970 | Madler et al. | 180/22 |
| 3,590,934 | 7/1971 | Wappler et al. | 180/333 |
| 3,887,210 | 6/1975 | Funke | 280/87.01 |
| 4,022,146 | 5/1977 | Sadler | 180/273 |

FOREIGN PATENT DOCUMENTS 428336  8/1911  France ................................. 180/273

Primary Examiner—John J. Love
Assistant Examiner—Kenneth R. Rice
Attorney, Agent, or Firm—Erwin S. Teltscher

[57] ABSTRACT

A versatile recreational vehicle adapted to be towed by a ski lift includes a frame-shaped chassis and six wheels which are rotatably mounted on the chassis and include steerable wheels which are mounted on the chassis for turning about respective substantially vertical axes. A turning arrangement is provided for turning the steerable wheels about the vertical axes to steer the vehicle, and brakes are provided for braking at least some of the wheels. A single control element is provided for controlling the operation of both the steering arrangement and the brakes, this single control element being constituted by a control lever which is mounted on the chassis for omnidirectional movement. A winding roller is rotatably mounted on the chassis and a fabric seat element having one portion connected to the chassis and another portion wound around the winding roller. A towing cable is being used for towing the vehicle. A connecting mechanism releasably connects the vehicle to the towing cable. The connecting mechanism can be released either manually by displacing a disengagement lever or automatically in response to the rotation of the winding roller.

11 Claims, 7 Drawing Sheets

RECREATIONAL VEHICLE

BACKGROUND OF THE INVENTION

The present invention relates to recreational or leisure vehicles in general, and more particularly to a versatile recreational vehicle which is particularly suited for being towed by a ski lift.

The vehicle of the present invention is to be used particularly for driving down on inclined slopes or meadows and, more generally, for accomplishing journeys on all terrains.

There are already known various special vehicles for travelling on sloped terrains with slight relief. Such vehicles usually include four driven wheels equipped with large-size tires having pronounced tread patterns so as to give the vehicle good stability and a motive and displacement power which is essential for the proper use of the vehicle.

The combination of an elevated motor as well as a chassis which is even more elevated and of a suspension having a high resistance permits the vehicle to pass over or negotiate without difficulty small obstacles and unevennesses frequently encountered when traveling on rough terrain. Inasmuch as such vehicles are powered by powerful and hence heavy motors, their mobility is mediocre and, as a result, they would not be suited for use in leisure activities in which mobility and maneuverability of the vehicle are important factors of amusement derived from and attraction of such vehicles.

There are also already known very light vehicles with large wheels, whose engagement with the ground is enhanced by a very large number of wheels. Such usually single-seat vehicles have a tubular chassis and simple means for steering and braking. Unfortunately, such vehicles, in their non-motorized versions, do not possess all of the necessary safety functions or features, or a mechanism for rapid connection and release to enable such vehicles to be towed under favorable conditions, for instance, by ski lifts. Furthermore, such known vehicles do not possess a sufficient maneuverability which is a principal attraction of a recreational or leisure vehicle of the kind here under consideration. Moreover, the set of steerable wheels of such a vehicle does not offer a sufficient stability for the driving conditions involving rapid changes in the direction of travel.

SUMMARY OF THE INVENTION

Accordingly, it is a general object of the present invention to avoid the disadvantages of the prior art.

More particularly, it is an object of the present invention to provide a recreational or leisure vehicle which does not possess the drawbacks of the known vehicles of this type.

Still another object of the present invention is to devise a vehicle of the type here under consideration having a very high stability even under adverse driving conditions.

It is yet another object of the present invention to design the above vehicle in such a manner as to be able to safely tow the same by a ski lift or another towing apparatus.

A concomitant object of the present invention is so to construct the vehicle of the above type as to be relatively simple in construction, inexpensive to manufacture, easy to use and handle, and yet reliable in operation.

In keeping with these objects and others which will become apparent hereafter, one feature of the present invention resides in a versatile recreational vehicle adapted to be towed by a ski lift. This vehicle comprises a frame-shaped chassis having a front end and a rear end and six wheels rotatably mounted on the chassis and including steerable wheels which are mounted on the chassis for turning about respective substantially vertical axes. The vehicle is equipped with means for turning the steerable wheels about their vertical axes to steer the vehicle, and with means for braking at least some of the wheels. According to the invention, there is provided means for controlling the turning and braking means, such controlling means including a control element having one portion connected to the turning means and another portion connected to the braking means. A seat is provided, including a winding roller rotatably mounted on the chassis and a fabric seat element having one portion connected to the chassis and another portion wound around the winding roller. A towing cable is to be used for towing the vehicle. There is further provided means for releasably connecting the vehicle to the towing cable, including a disengagement lever for manually releasing the towing cable from the vehicle, and means for automatically releasing the towing cable from the vehicle in response to the rotation of the winding roller. The vehicle further includes means arranged at the rear end of the chassis and operative for preventing backward movement of the vehicle.

Advantageously, the chassis includes a transversely extending rear support element at the rear end thereof, and the backward movement preventing means includes two angular adjustable legs mounted on the rear support element and each having a free end rearwardly spaced from the rear support element, and two anti-backing shoes each articulately mounted at the free end of one of the legs and constituting a blocking abutment in a transverse position thereof assumed upon commencement of rearward movement of the vehicle.

According to another advantageous aspect of the present invention, the chassis includes a transverse intermediate reinforcing member, the turning means includes a steering bar mounted on the intermediate reinforcing member for pivoting about a substantially vertical axis, the braking means includes two brakes and two brake cables each having one end connected to one of the brakes and another end, and the controlling means includes an inclined support rigid with the intermediate reinforcing member, a control element having a central region mounted on the inclined support for omnidirectional movement relative thereto and two end portions, an elongated carrier extending centrally from and substantially perpendicularly to the steering bar and mounted thereon only for pivoting along a plane which is substantially perpendicular to the steering bar, a support plate mounted on the carrier for movement longitudinally thereof and having a front face, a universal joint connecting one of the end portions of the control element to the support plate, and a coupling bar rigid with and arranged at the front face of the support plate and having the other ends of the brake cables connected thereto. The steering bar has two end portions and the turning means advantageously further includes a steering cable extending along a loop-shaped course at an internal perimeter of the chassis, connected to the steerable wheels, and having two end portions each secured to one of the end portions of the steering bar.

It is particularly advantageous when the means for releasably connecting the vehicle to the towing cable further includes a pivotable channel member, a terminal element rigid with the towing cable and slidably received in the channel member, and means for retaining the terminal element in position in the channel member with ratchet-type action, the retaining means being operatively connected with the disengagement lever and with the winding roller for actuation thereby. In this context, it is advantageous when the terminal element includes adjacent conical and cylindrical sections and an end face which faces the towing cable and is provided with a detaining groove for engagement of the retaining means therein. Such retaining means may advantageously include a releasing lever and a hook rigid with the releasing lever.

According to the present invention, the releasably connecting means further includes an adjustable fixation element which is mounted on the chassis below the seat, a spring affixed to the fixation element, a control cable including two loop portions and extending from the disengagement lever to the spring, the control cable passing through the retaining channel member and continuing from there toward the winding roller, and an abutment element secured to the control cable at the retaining channel member and bracing itself against the retaining channel member in response to displacement of the disengagement lever toward a releasing position thereof. Advantageously, at least that of the loop portions of the control cable which extends between the disengagement lever and the releasably connecting means includes a flexible elongated element and a sheathing surrounding the elongated element and terminating at the releasing lever to expose a portion of the elongated element which extends toward and through the channel member, there being further provided a guiding sleeve slidably surrounding the portion of the elongated between the releasing lever and the channel member, and a keeping spring surrounding the guiding sleeve and that part of the portion of the elongated element which extends out of the guiding sleeve between the releasing lever and the channel member and urging the releasing lever toward a locking position thereof in which the hook engages in the groove of the detaining member, the other of the loop portions of the control cable extending from the abutment element toward the fixation element past the winding roller and in mechanical engagement therewith.

According to another facet of the present invention, the control cable is operative for transmitting displacements attendant to the rotation of the winding roller to the releasably connecting means. Advantageously, the control cable passes through the winding roller and forms several convolutions around an outer circumferential surface of the winding roller.

The versatile recreational vehicle according to the present invention has many important advantages. It has a great stability and it possesses a number of security features which give the vehicle the characteristics and properties necessary for an intensive use of the vehicle both while being towed uphill and while driving downhill on any terrain even by users who are not experiences and who have an only average level of skill and agility.

Moreover, the recreational or leisure vehicle according to the invention is suited for various rather simple further modifications and enhancements for its conversion or transformation for various other uses, such as a portable individual vehicle for use by the handicapped, a sports vehicle for driving on any terrain, portable carrier for golf equipment, and so on.

In addition to the complete versatility and universality of use, the recreational vehicle of the present invention possesses a number of other advantages, the principal ones of which will be recited below:

great stability on terrains of any kind;

great safety due to the protection of all of the essential functions;

rapid connection to and release from a towing element in relation to safety in dependence on the seat occupancy;

safety while driving on slopes and while being towed due to the provision of an anti-backing arrangement;

facility of handling due to the concentration of the principal commands of steering and braking into a single control element.

BRIEF DESCRIPTION OF THE DRAWING

The present invention will be described below in more detail with reference to the accompanying drawing in which:

FIG. 8 is a vertical sectional view showing a steerable wheel of the vehicle of FIG. 1 and its suspension.

DETAILED DESCRIPTION OF THE PREFERRED EMBODIMENT

Figure 1:
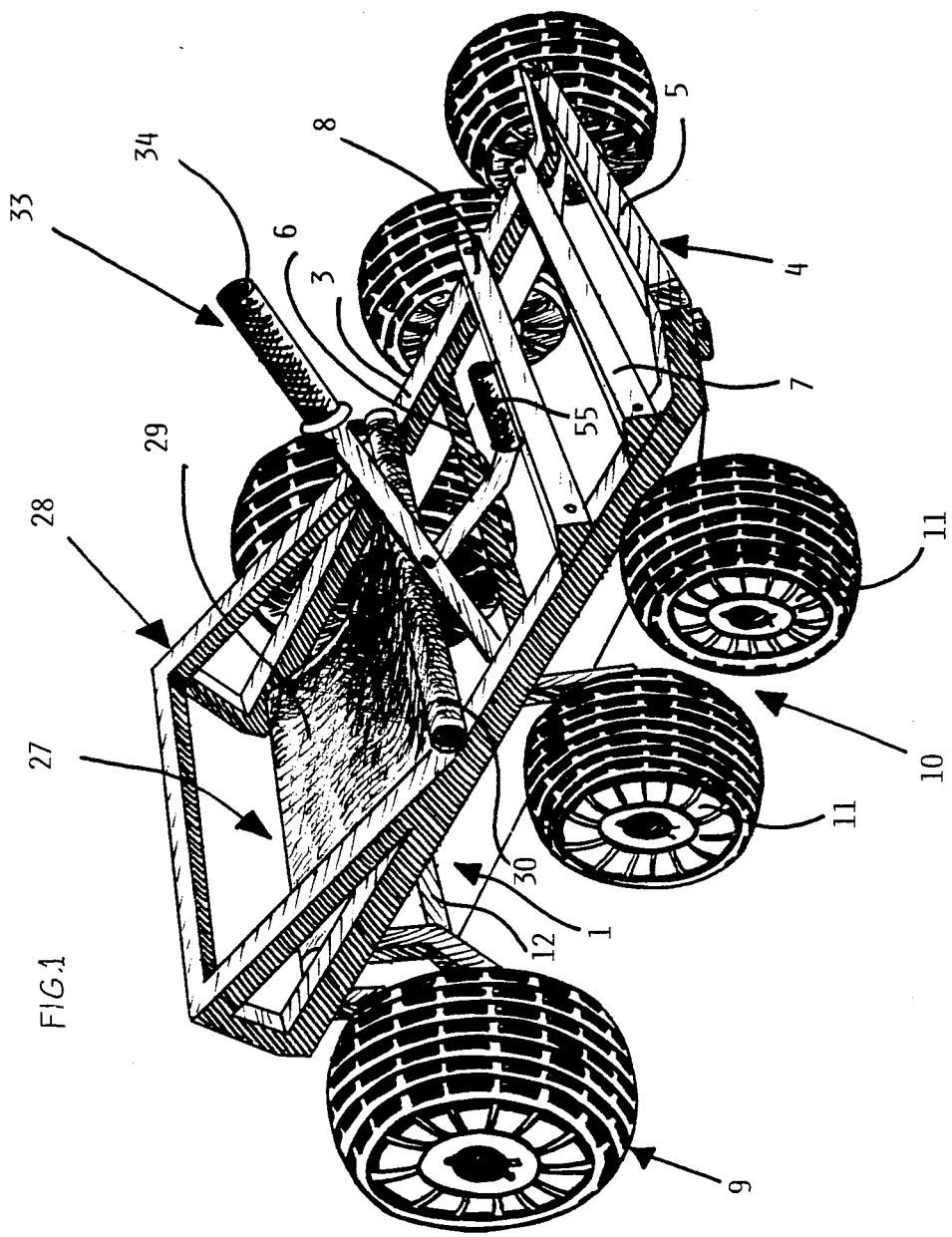
FIG. 1 is a perspective view of a recreational vehicle of the present invention.

Referring now to the drawing in detail, and first to FIG. 1 thereof, it may be seen that it generally depicts a recreational vehicle according to the present invention. The recreational vehicle includes a chassis 1 which consists of a plurality of interconnected elongated frame members, such as 2. The frame members may be tubular and may have, for instance, square cross sections, and they may be connected to one another to form the frame 1 by soldering or welding. The chassis 1 includes a frame 3 which has a raised front end 4 which includes a support member 5 for supporting the feet of the user of the recreational vehicle. The support member 5 is so arranged as to constitute an inclined step. The frame 3 of the chassis 1 is reinforced by a transversely extending intermediate reinforcing member 6. Two additional steps or support members 7 and 8 are provided at the front end 4 of the frame 3 to constitute supports for the feet of users who have legs of different lengths in accordance with the statures of such users, such as children, adolescents or adults. Even the support members 7 and 8 constitute inclined steps. The inclined positions of the support members 5, 7 and 8 provide an improved support for the feet of the users of the recreational vehicle.

Wheels 9 and 11 are mounted on the respective lateral regions of the chassis 3, such wheels including a set of non-steerable rear wheels 9 and a set 10 of steerable front wheels 11. The set 10 of the front wheels 11 includes four of the wheels 11 of a known type which are independent of one another. As shown particularly in FIG. 2 of the drawing, the rear wheels 9 are mounted for rotation about a rigid rear axle 12, and they are equipped with braking devices 13, such as drum brakes.

Each of the front wheels 11 is connected to the chassis 1 by a suspension 14 (see particularly FIG. 8) which mounts the respective front wheel 11 on the chassis 1 for rotation and for steered turning in the manner described below. An axle 15 of the respective front wheel 11 is rigid with a bifurcated steering bracket 16 which is mounted for turning about a vertical axle 17 which, in turn, is carried by a sleeve-shaped support element 18. The support element 18 is mounted for pivoting along a vertical plane on a vertical extension 19 of the adjacent portion of the chassis 1, by means of one or more articulating elements 20. The suspension 14 further includes at least one, but preferably two (see FIG. 3) oscillation damping blocks 21 of rubber or other elastomeric material. The damping blocks 21 are interposed between the extension 19 and the steering bracket 16. A steering lever 22 is affixed to the steering bracket 16, and it provides for maneuvering in dependence on steering commands.

Figure 2:
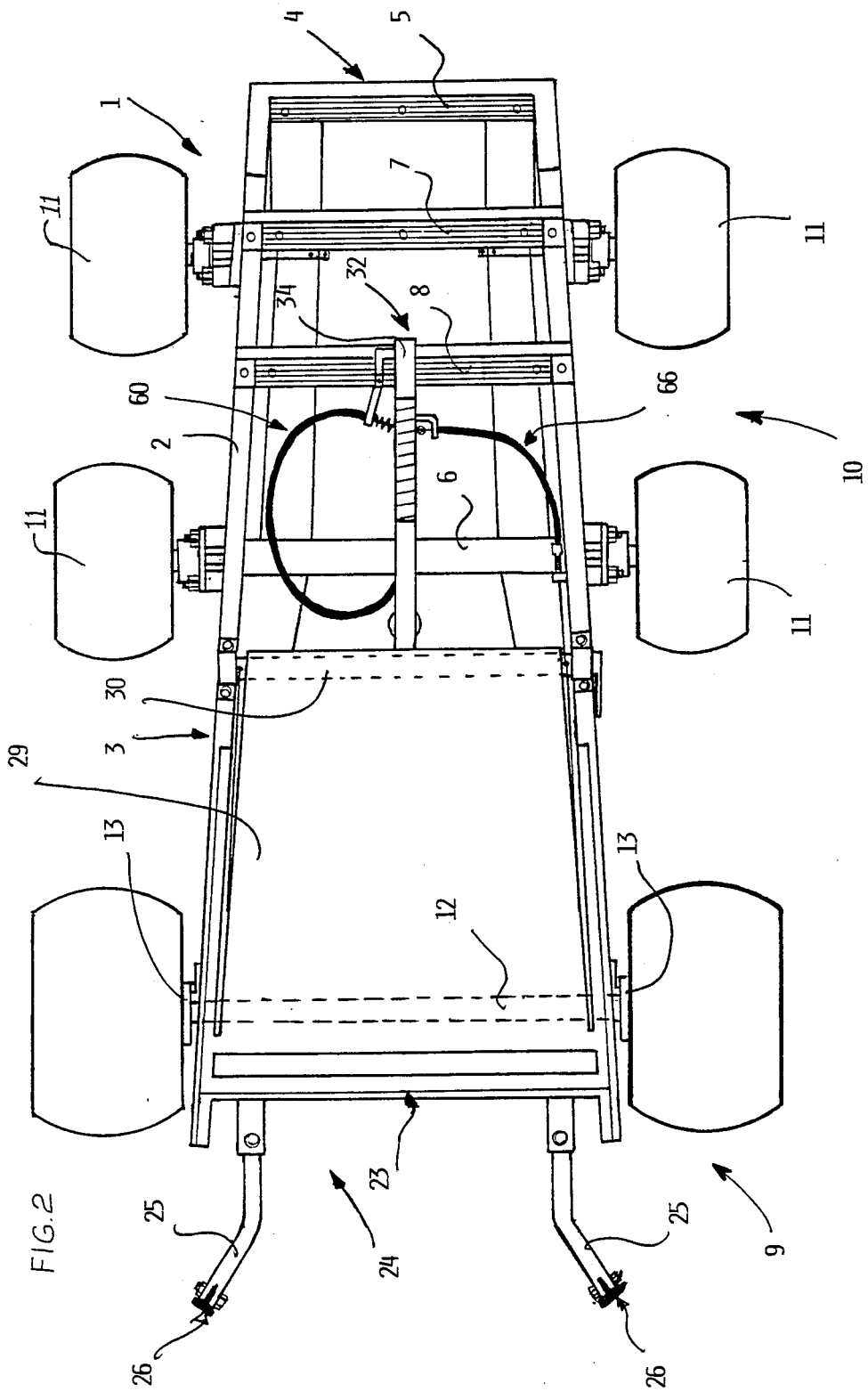
FIG. 2 is a top plan view of the recreational vehicle of FIG. 1.

As illustrated particularly in FIG. 2 of the drawing, the frame 3 of the chassis 1 further includes a transversely extending rear support element 23. The support element 23 carries an anti-backing arrangement 24 which, in the illustrated exemplary construction, includes two angular adjustable legs 25 each of which is equipped with an anti-backing shoe 26 which is articulately mounted at the free end of the respective leg 25 in such a manner as to be blocked in a transverse position on the respective leg 25. Because of the provision of the anti-backing arrangement 24, the anti-backing shoes 26 drag on the ground in semi-inclined positions during normal operation without offering any significant resistance to forward movement of the vehicle, while they rapidly become abutments at the time of rearward movement or backing, in that the anti-backing shoes 26 are forced to assume vertical blocking positions after engaging the ground. Because of the relatively long longitudinal dimension of the legs 25, the arrangement 24 is also capable of serving as an arrangement for preventing backward tilting of the vehicle.

As shown especially in FIG. 1 of the drawing, the chassis 1 carries a seat 27 which is delimited at three of its sides by a safety border 28. The safety border 28 may be constituted, for example, by elongated tubular elements which are soldered or welded to one another. The seat 27 includes a fabric seat element 29 which is suspended between a fixed rear transverse support element, such as the support element 23, and a winding roller 30 which is mounted on the frame 3 for turning or pivoting about an axis extending transversely of the frame 3. The fabric seat element 27 maintained in a substantially horizontal position by means of a suitable pulling mechanism 31 (see particularly FIG. 6) in cooperation with a latching and releasing mechanism 32 which will be explained in more detail below.

Figure 3:
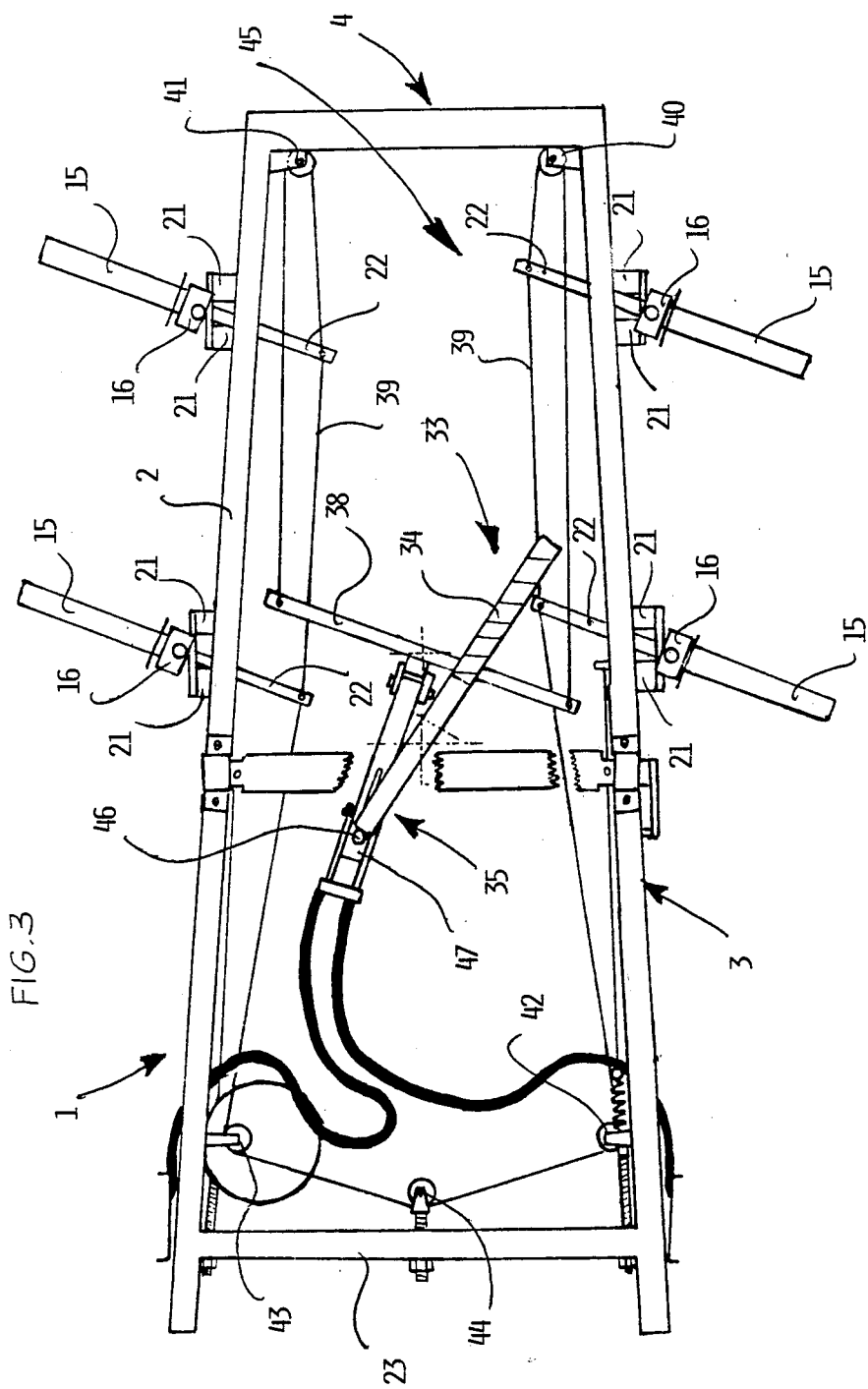
FIG. 3 is a view similar to FIG. 2 but with certain parts removed so as to reveal other parts.
Figure 4:
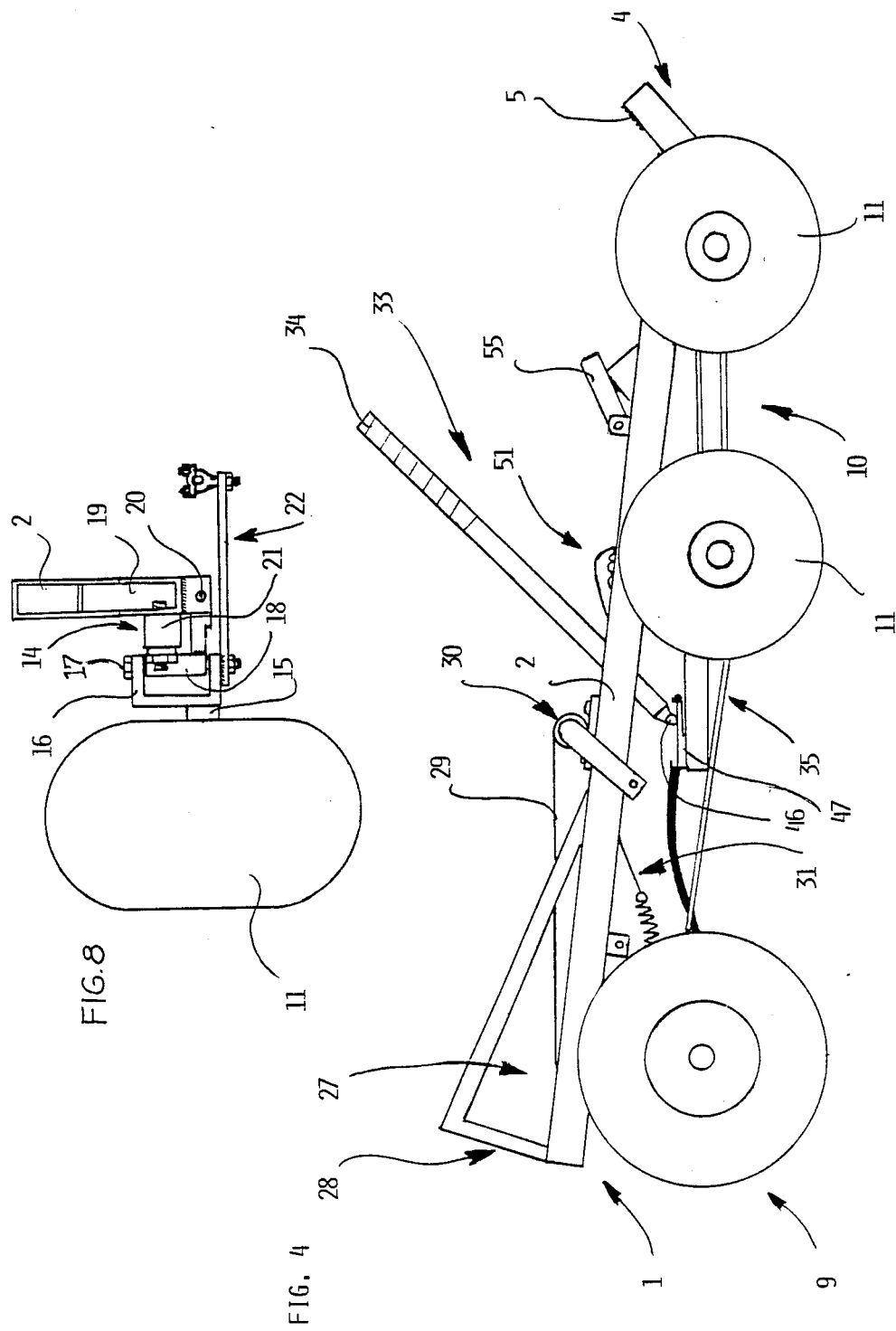
FIG. 4 is a side elevational view of the recreational vehicle of FIG. 1.
Figure 5:
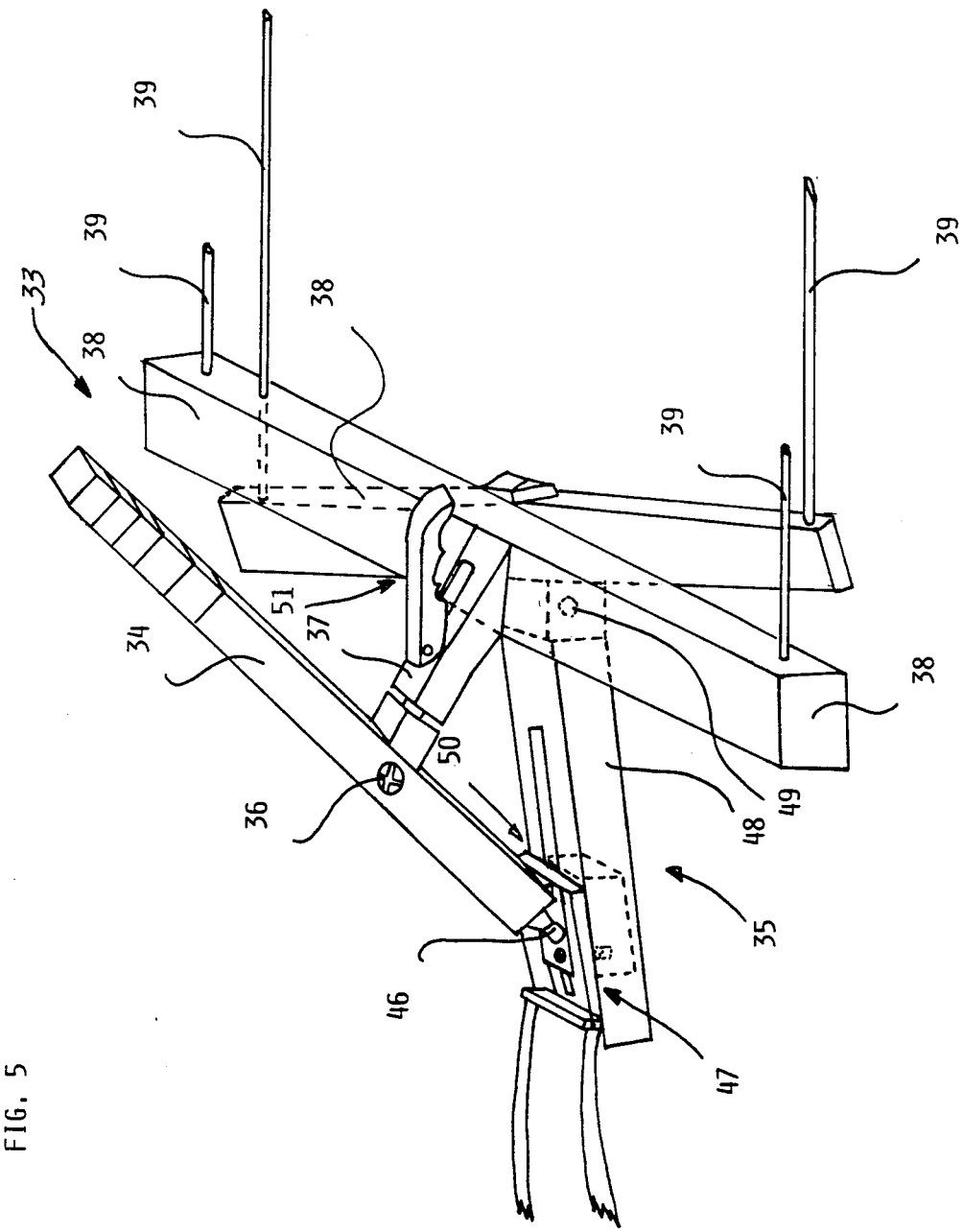
FIG. 5 is a fragmentary enlarged detail view of a steering and braking control arrangement of the recreational vehicle of FIG. 1.

The recreational vehicle according to the present invention is provided at its central region with a control assembly 33 which includes, as may be seen from consideration particularly of FIGS. 3 and 5 of the drawing in conjunction with one another, an omnidirectional control element or lever 34 which is advantageously sleeve-shaped and which is operative for moving the axles 15 which support the front wheels 11 of the wheel set 10 in the desired directions by being moved to the right or to the left, and for braking the vehicle by being pulled in the rearward direction.

More particularly, the control element 34 is mounted on a movable carrier 35 which provides for the possibility of omnidirectional movements within a range delimited by abutments. The control element 34 is articulated at its central region by means of a pivot 36 on an inclined support 37 which is rigid or integral with the intermediate reinforcing member 6. A steering bar or beam 38 is pivotably mounted on the intermediate reinforcing member 6. The steering bar 38 has two end portions to each of which there is affixed one end of a steering cable 39. The steering cable 39 is trained at the front portion of the chassis 1 about respective front reversing pulleys 40 and 41 and at the rear portion of the chassis 1 around respective rear diverting pulleys 42 and 43 and a tension-regulating pulley 44 to form a loop 45, to which there are connected the free ends of the steering levers 22 which constitute continuations of the axles 15 of the front wheels 11.

The control element 34 is articulated by means of a universal joint 46 to a support plate 47 which is capable of moving along a central support 48 which extends perpendicularly to the steering bar 38 and which is free to conduct pivoting movements along a vertical plane perpendicular to the steering bar 38 by being mounted on the steering bar 38 by means of a horizontally extending pivoting axle 49. The above-discussed combination of articulations permits the user of the vehicle to pull the control element 34 in regardless of its position, and thus to effectuate translatory movement of the support plate 47, to simultaneously pull or push two braking cables which are connected to braking jaws, by means of a coupling bar 50 which is rigid with the support plate 47 and is arranged at the front face of the support plate 47. It is now possible, in accordance with the present invention, to achieve the braking action even though the vehicle may be turning at the same time, and regardless of the instantaneous positions of the various components of the vehicle.

Figure 6:
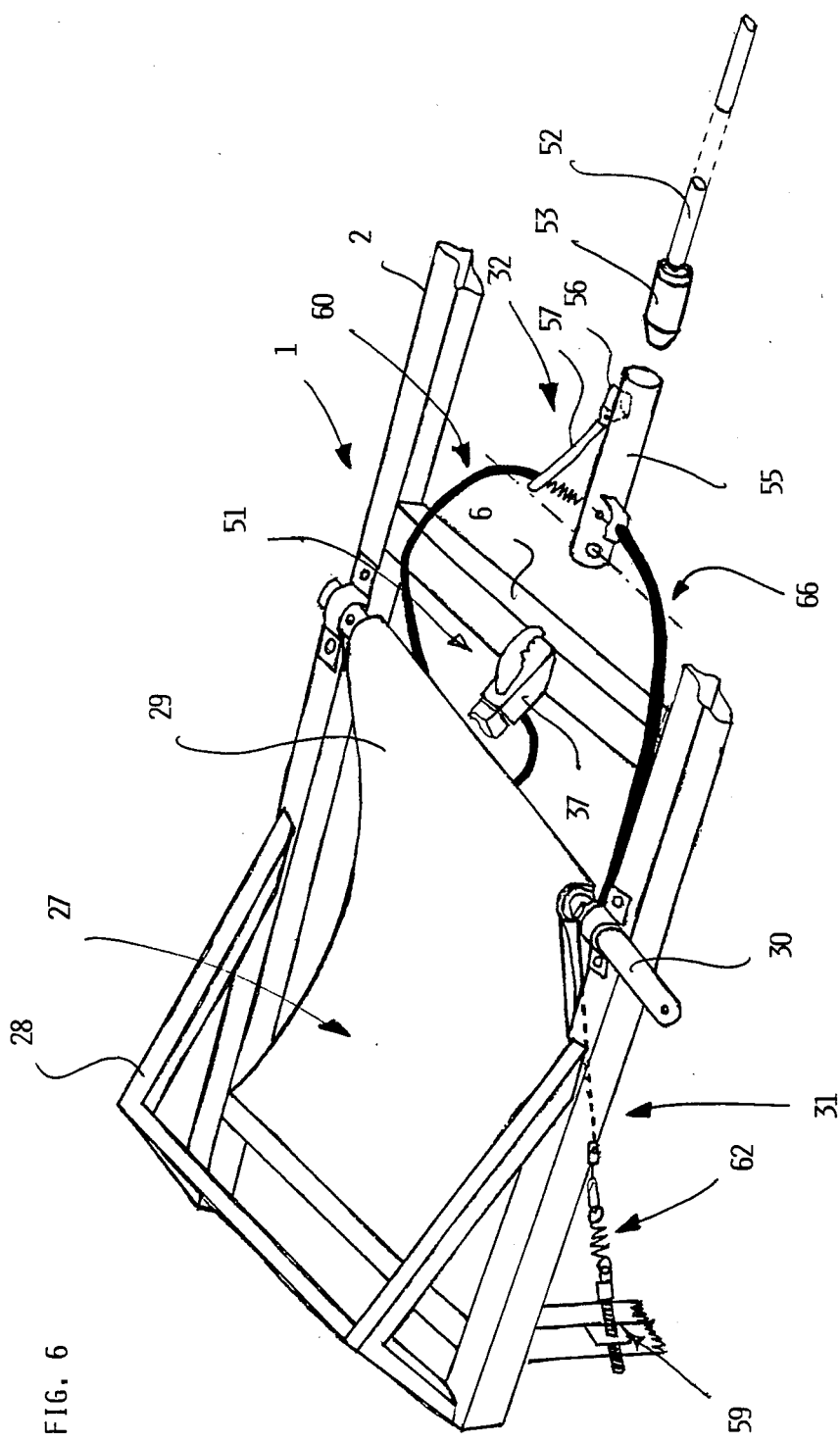
FIG. 6 is a perspective view of a portion of the recreational vehicle of FIG. 1 showing an arrangement for releasably connecting the vehicle to a tow cable.
Figure 7:
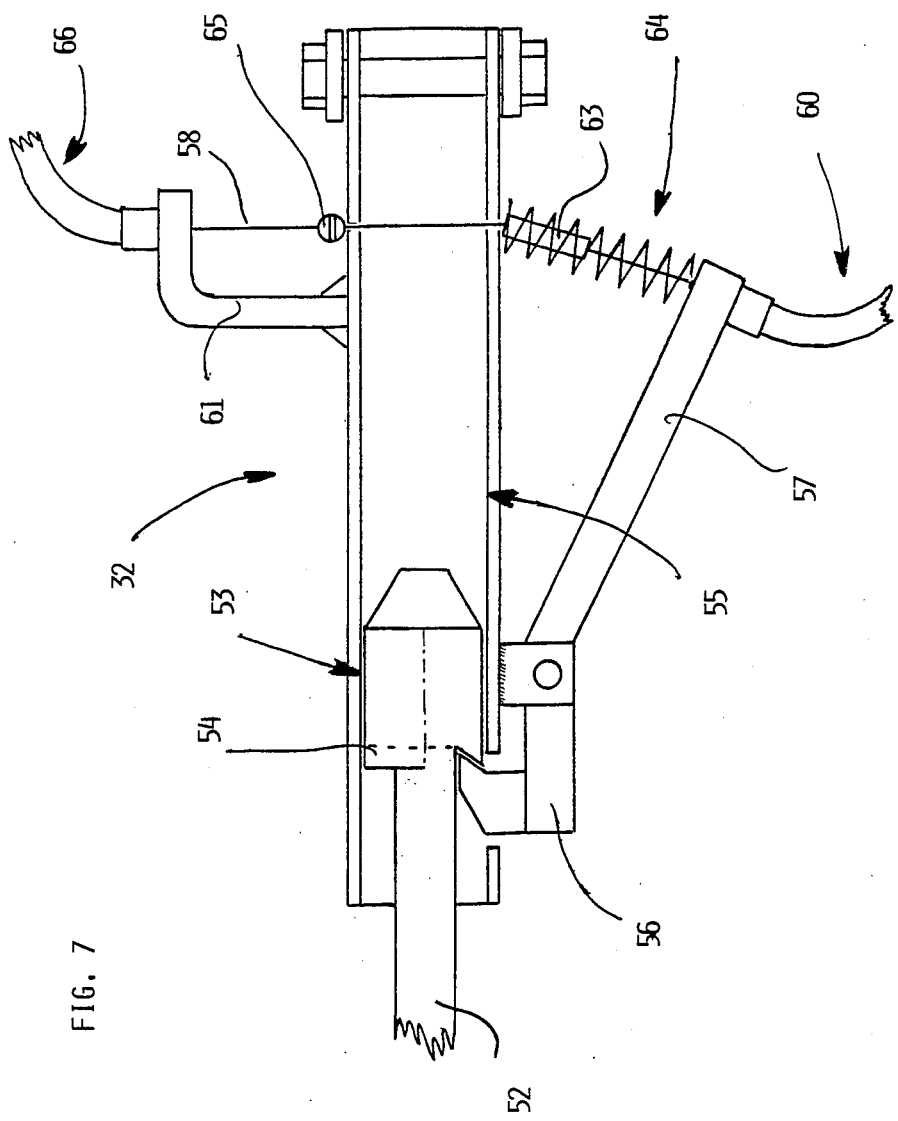
FIG. 7 is an enlarged longitudinal sectional view of the releasably connecting arrangement of FIG. 6.

The inclined support 37 further carries a disengagement lever 51 for releasing a towing cable 52 which may be seen particularly in FIGS. 6 and 7. The aforementioned latching and releasing mechanism 32 for the towing cable 52 will now be explained in some detail as to its construction and operation both in response to a manual release command by means of the disengagement lever 51 and during automatic release by the roller 30 of the seat 27.

The towing cable 52 is connected at one of its ends, for example, to a lower portion of a rod which is provided on a ski lift and it terminates at its other end in a ratchet-type detaining member 53. The detaining member 53 is, for example, partly cylindrical and partly conical as illustrated and is provided at its end which is joined to the other end of the towing cable 52 with a detaining groove 54 which is, for instance, conical and concentric with the detaining member 53 as also illustrated in FIG. 7 of the drawing, the detaining groove 54 being formed at the end face of the detaining member 53 and being operative for cooperating with retaining means.

The ratchet-type detaining member 53 engages in a retaining channel member 55 which is mounted at one of its ends for pivoting along a vertical plane. The detaining member 53 is slidingly received in the retaining channel member 55 and is retained therein by the action of a hook 56 which becomes engaged in the retaining groove 54.

The hook 56 is rigid with a releasing lever 57 which is caused to move into its releasing position by a control cable 58 which is acted upon by both the disengagement lever 51 and the arrangement or winding roller 30 for winding up the fabric 29 of the seat 27. As will be appreciated upon consideration of FIGS. 6 and 7 of the drawing, the control cable 58 is of one piece but includes two loop portions 60 and 66. The control cable 58 commences at the disengagement lever 51 and terminates at an adjustable fixation element 59 which is arranged below the seat 27, and it passes through the retaining channel member 55 at the region of which it carries an intermediate abutment element 65 capable of abutting against the body of the channel member 55, with interruption of the sheathing of the control cable 58 at the end of the releasing lever 57, to constitute a first loop portion 60, and then continues through a transverse leg 61 to the region of the winding roller 30 for the fabric 29, about which it is fixedly trained to wrap itself around the winding roller 30 in an elastic retraction fashion by means of a spring 62 which is fixed in an adjustable manner to the fixation element 59 that is mounted on the chassis 1.

More particularly, a first loop portion 60 of the aforementioned loop portions 60 and 66 terminates at one side of the channel member 55 in a guiding sleeve 63 which slidably surrounds the portion of the control cable 58 which is situated at the one side of the channel member 55. A keeping spring 64 is arranged around the guiding sleeve 63 and the portion of the control cable 58 which extends out of the guiding sleeve 63 at the one side of the channel member 55 and urges the releasing lever 57 toward its locking position in whioh the hook 56 engages the detaining member 53 and holds the same in position. The release of the towing cable 52 is effected by pulling on the disengagement lever 51 and by the bracing of the abutment element 65 which is rigidly mounted on the control cable 58 against the other side of the channel member 55. The control cable 58 then continues into the second loop portion 66 of the aforementioned loop portions 60 and 66 which extends toward the winding roller 30, with which the control cable 58 is in mechanical engagement, for example, by passing through the winding roller 30 and then forming several convolutions around the circumferential surface of the winding roller 30. The sheathing which is slidable with respect to the control cable 58 and to the releasing lever 57 approaches the body of the channel member 55 during the releasing movement of the cable 58.

Furthermore, the turning of the winding roller 30 under the influence of the spring 62 in the sense of winding up both the fabric 29 and the control cable 58 results in sliding of the control cable 58 in its sheathing and, due to reaction against the disengagement lever 51, the pivoting of the releasing lever 57 towards its releasing position. Thus, when the user of the vehicle leaves the seat 27, either voluntarily or by accident, the vehicle is automatically put into its released condition, that is, it is detached from the towing cable 52. This feature is particularly useful at the end of the course of the lift or at descending portions of the course of the lift so as to avoid uncontrolled movement of the vehicle after entering the return run of the lift.

While the present invention has been described and illustrated herein as embodied in a specific construction of a recreational vehicle to be towed uphill by a lift, it is not limited to the details of this particular construction, since various modifications and structural changes are possible and contemplated by the present invention. Thus, the scope of the present invention will be determined exclusively by the appended claims.

What is claimed is:

1. A versatile recreational vehicle adapted to be towed by a ski lift, comprising
    a frame-shaped chassis having a front end and a rear end;
    six wheels rotatably mounted on said chassis and including steerable wheels which are mounted on said chassis for turning about respective substantially vertical axes;
    means for turning said steerable wheels about said axes to steer the vehicle;
    means for braking at least some of said wheels;
    means for controlling said turning and braking means, including a control element having one portion connected to said turning means and another portion connected to said braking means;
    a seat including a winding roller rotatably mounted on said chassis and a fabric seat element having one portion connected to said chassis and another portion wound around said winding roller;
    a towing cable for towing the vehicle;
    means for releasably connecting the vehicle to the towing cable, including a disengagement lever for manually releasing the towing cable from the vehicle, and means for automatically releasing the towing cable from the vehicle in response to the rotation of said winding roller; and
    means arranged at the rear end of said chassis and operative for preventing backward movement of the vehicle.

2. The vehicle as defined in claim 1, wherein said chassis includes a transversely extending rear support element at said rear end thereof; and wherein said backward movement preventing means includes two angular adjustable legs mounted on said rear support element and each having a free end rearwardly spaced from said rear support element, and two anti-backing shoes each articulately mounted at said free end of one of said legs and constituting a blocking abutment in a transverse position thereof assumed upon commencement of rearward movement of the vehicle.

3. The vehicle as defined in claim 1, wherein said chassis includes a transverse intermediate reinforcing member; wherein said turning means includes a steering bar mounted on said intermediate reinforcing member for pivoting about a substantially vertical axis; wherein said braking means includes two brakes and two brake cables each having one end connected to one of said brakes and another end; and wherein said controlling means includes an inclined support rigid with the intermediate reinforcing member, a control element having a central region mounted on said inclined support for omnidirectional movement relative thereto and two end portions, an elongated carrier extending centrally from and substantially perpendicularly to said steering bar and mounted thereon only for pivoting along a plane which is substantially perpendicular to said steering bar, a support plate mounted on said carrier for movement longitudinally thereof and having a front face, a universal joint connecting one of said end portions of said control element to said support plate, and a coupling bar rigid with and arranged at said front face of said support plate and having said other ends of said brake cables connected thereto.

4. The vehicle as defined in claim 3, wherein said steering bar has two end portions; and wherein said turning means further includes a steering cable extending along a loop-shaped course at an internal perimeter of said chassis, connected to said steerable wheels, and having two end portions each secured to one of said end portions of said steering bar.

5. The vehicle as defined in claim 1, wherein said means for releasably connecting the vehicle to the towing cable further includes a pivotable channel member, a terminal element rigid with said towing cable and slidably received in said channel member, and means for retaining said terminal element in position in said channel member with ratchet-type action, said retaining means being operatively connected with said disengagement lever and with said winding roller for actuation thereby.

6. The vehicle as defined in claim 5, wherein said terminal element includes adjacent conical and cylindrical sections and an end face which faces said towing cable and is provided with a detaining groove for engagement of said retaining means therein.

7. The vehicle as defined in claim 5, wherein said retaining means includes a releasing lever and a hook rigid with said releasing lever.

8. The vehicle as defined in claim 7, wherein said releasably connecting means further includes an adjustable fixation element which is mounted on said chassis below said seat, a spring affixed to said fixation element, a control cable including two loop portions and extending from said disengagement lever to said spring, said control cable passing through said retaining channel member and continuing from there toward said winding roller, and an abutment element secured to said control cable at said retaining channel member and bracing itself against said retaining channel member in response to displacement of said disengagement lever toward a releasing position thereof.

9. The vehicle as defined in claim 8, wherein at least that of said loop portions of said control cable which extends between said disengagement lever and said releasably connecting means includes a flexible elongated element and a sheathing surrounding said elongated element and terminating at said releasing lever to expose a portion of said elongated element which extends toward and through said channel member; further comprising a guiding sleeve slidably surrounding said portion of said elongated between said releasing lever and said channel member, and a keeping spring surrounding said guiding sleeve and that part of said portion of said elongated element which extends out of said guiding sleeve between said releasing lever and said channel member and urging said releasing lever toward a locking position thereof in which said hook engages in said groove of said detaining member; and wherein the other of said loop portions of said control cable extends from said abutment element toward said fixation element past said winding roller and in mechanical engagement therewith.

10. The vehicle as defined in claim 9, wherein said control cable transmits displacements attendant to the rotation of said winding roller to said releasably connecting means.

11. The vehicle as defined in claim 9, wherein said winding roller has an outer circumferential surface; and wherein said control cable passes through said winding roller and forms several convolutions around said outer circumferential surface of said winding roller.

* * * * *